(12) United States Patent
Patel

(10) Patent No.: US 6,222,592 B1
(45) Date of Patent: Apr. 24, 2001

(54) TV RECEIVER EQUALIZER STORING CHANNEL CHARACTERIZATIONS FOR EACH TV CHANNEL BETWEEN TIMES OF RECEPTION THEREFROM

(75) Inventor: Chandrakant B. Patel, Hopewell, NJ (US)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/168,892

(22) Filed: Oct. 9, 1998

Related U.S. Application Data
(60) Provisional application No. 60/097,614, filed on Aug. 24, 1998, provisional application No. 60/079,340, filed on Mar. 25, 1998, and provisional application No. 60/071,288, filed on Jan. 13, 1998.

(51) Int. Cl.[7] .............................. H04N 5/21; H04N 5/213; H04N 5/455; H04L 27/01

(52) U.S. Cl. ...................... 348/614; 348/607; 348/611; 348/731; 348/914; 375/232; 375/233; 364/724.2; 364/724.19

(58) Field of Search .................................. 348/607, 614, 348/624, 914, 611, 641, 726, 731; 358/36, 37, 157, 166, 905; 375/229, 232, 233; 364/724.19, 724.2; H04N 5/21, 5/213, 5/455; H04L 27/01

(56) References Cited

U.S. PATENT DOCUMENTS

| | | | | |
|---|---|---|---|---|
| 5,475,444 | * | 12/1995 | Kim | 348/608 |
| 5,483,557 | * | 1/1996 | Webb | 375/349 |
| 5,530,725 | * | 6/1996 | Koch | 375/347 |
| 5,648,987 | * | 7/1997 | Yang et al. | 375/232 |
| 5,654,765 | * | 8/1997 | Kim | 348/614 |
| 5,805,480 | * | 9/1998 | Greenberg | 364/724.19 |
| 5,838,740 | * | 11/1998 | Kallman | 375/346 |
| 5,856,748 | * | 3/1999 | Lee | 348/614 |
| 5,862,192 | * | 1/1999 | Huszar | 375/262 |
| 5,898,731 | * | 4/1999 | Kwak | 375/230 |
| 5,940,454 | * | 8/1999 | McNicol | 375/347 |
| 6,124,898 | * | 9/2000 | Patel | 348/614 |

* cited by examiner

Primary Examiner—Matthew Luu
Assistant Examiner—Wesner Sajous
(74) Attorney, Agent, or Firm—Sughrue, Mion, Zinn, Macpeak & Seas, PLLC

(57) ABSTRACT

An adaptive channel equalizer for a digital television receiver includes memory for storing channel characterization information for each received channel, from each time the channel is tuned to until the next time the same channel is tuned to. The stored information is retained even if operating power to the receiver is interrupted. Whenever operating power is restored to the receiver after interruption and whenever a channel is tuned to again after having tuned to another channel, the previously stored channel characterization for the currently tuned channel is retrieved from memory. The retrieved channel characterization is used to calculate initial filter coefficients for the adaptive channel equalizer.

24 Claims, 7 Drawing Sheets

TV RECEIVER EQUALIZER STORING CHANNEL CHARACTERIZATIONS FOR EACH TV CHANNEL BETWEEN TIMES OF RECEPTION THEREFROM

This application is filed under 35 U.S.C. 111(a) claiming pursuant to 35 U.S.C. 119(e)(1) benefit of the filing dates of: provisional application Ser. No. 60/097,614 filed pursuant to 35 U.S.C. 111 (b) on Aug. 24, 1998; provisional application Ser. No. 60/079,340 filed pursuant to 35 U.S.C. 111(b) on Mar. 25, 1998; and provisional application Ser. No. 60/071,288 filed pursuant to 35 U.S.C. 111 (b) on Jan. 13, 1998.

The invention relates to channel equalizers for television receivers.

BACKGROUND OF THE INVENTION

U.S. Pat. No. 5,654,765 issued Aug. 5, 1997 to D. J. Kim and entitled "CHANNEL EQUALIZER FOR DIGITAL TELEVISION RECEIVER HAVING AN INITIAL COEFFICIENT STORAGE UNIT" is incorporated herein by reference. Kim describes a digital television (DTV) receiver capable of receiving signal transmitted via any selected one of a plurality of transmission channels, which DTV receiver includes a particular type of channel equalizer. This type of channel equalizer comprises a channel equalization filter having adaptive filtering coefficients and circuitry for calculating the adaptive filtering coefficients of the channel equalization filter by decision-feedback methods using all symbol codes. Calculating the adaptive filtering coefficients of the channel equalization filter without initial information takes a considerable amount of time. Accordingly, this type of channel equalizer further comprises a memory for storing the adaptive filtering coefficients for each transmission channel during times another channel is tuned to and during times that portions of the DTV receiver do not receive power for operating. These adaptive filtering coefficients are reapplied to the channel equalization filter when a channel is re-tuned or when power for operating is restored to all portions of the DTV receiver. This facilitates "channel surfing" by a human using a DTV receiver provided with a viewscreen.

U.S. Pat. No. 5,648,987 entitled "RAPID-UPDATE ADAPTIVE CHANNEL-EQUALIZATION FILTERING FOR DIGITAL RADIO RECEIVERS, SUCH AS HDTV RECEIVERS" and issued Jul. 15, 1998 to J. Yang, C. B. Patel, T. Liu and A. L. R. Limberg is incorporated herein by reference. Yang et alii concern themselves with digital television signals that include a training signal. Yang et alii teach that the training signal can be used to establish initial values of the adaptive filtering coefficients for the channel equalization filter, after which decision-feedback methods can be relied on. The establishment of the initial values of the adaptive filtering coefficients in reliance upon the training signal normally will bring them to desired values much faster than can be done using decision-feedback methods, and stalling of such "convergence" in false minima of the error-detection procedure is better avoided. Decision-feedback methods using all symbol codes, not just those in a training signal, are usually superior for continuing adjustment of the adaptive filtering coefficients once "convergence" has been achieved or substantially achieved. They better allow the tracking of dynamic multipath distortion.

The vestigial-sideband DTV signal that is the current standard for terrestrial DTV broadcasting is suited for use with the Yang et alii methods. This VSB DTV signal comprises data frames each composed of two fields. Each field is composed of 313 consecutive-in-time data segments. The initial data segment of each data field includes a data field synchronization code composed of a 511-sample pseudo-noise sequence (or "PN-sequence") followed by three 63-sample PN sequences. The middle 63-sample PN sequence is inverted in logic sense from one data field to the next. Portions of these initial data segments can be utilized as training signal.

While the Yang et alii methods can converge the adaptive filtering coefficients quite rapidly when multipath distortion is principally static in nature, initial convergence remains a problem when multipath distortion is dynamic. While dynamic multipath distortion usually abates after some time, tuning from one transmission channel to another will at times take longer than is desirable. Accordingly, it is attractive to store information from a time dynamic multipath distortion was not a severe problem, to be used to establish initial values of adaptive filtering coefficients when a channel is re-tuned or when power for operating is restored to all portions of the DTV receiver. Rather than storing adaptive filtering coefficients for each channel per U.S. Pat. No. 5,654,765, one may instead store the channel characterization of each channel it is first pointed out in this specification.

SUMMARY OF THE INVENTION

A digital television (DTV) receiver embodying the invention is capable of receiving digital baseband symbol code transmitted via any selected one of a plurality of transmission channels. The DTV receiver has a channel equalizer including a channel equalization filter having an input connection to which digital baseband symbol code is supplied, having adaptive filtering coefficients, and having an output connection for supplying a channel equalization filter response. The DTV receiver has a memory for storing channel characterization coefficient terms at storage locations addressed in response to which of the plurality of transmission channels is currently selected for reception. This memory is of a type for storing the channel characterization coefficient terms even during times that other portions of the DTV receiver do not receive power for operating. The DTV receiver includes calculation circuitry for performing at least two types of calculation. The calculation circuitry calculates from the digital baseband symbol code supplied to the channel equalizer, the channel characterization coefficient terms to be written into the memory at those storage locations addressed in response to which of the plurality of transmission channels is currently selected for reception. The calculation circuitry calculates the adaptive filtering coefficients of the channel equalization filter based on channel characterization coefficient terms read from the memory. The DTV receiver includes an operations controller. The operations controller is arranged for responding to the other portions of the DTV receiver regaining power to direct the updating of the adaptive filtering coefficients of the channel equalization filter by the calculation circuitry in response to the channel characterization coefficient terms for the currently tuned channel being read thereto from the memory. The operations controller is arranged for responding to a transmission channel being re-tuned for reception to direct the updating of the adaptive filtering coefficients of the channel equalization filter by the calculation circuitry in response to the channel characterization coefficient terms for the re-tuned channel being read thereto from the memory.

DETAILED DESCRIPTION

Figure 1:
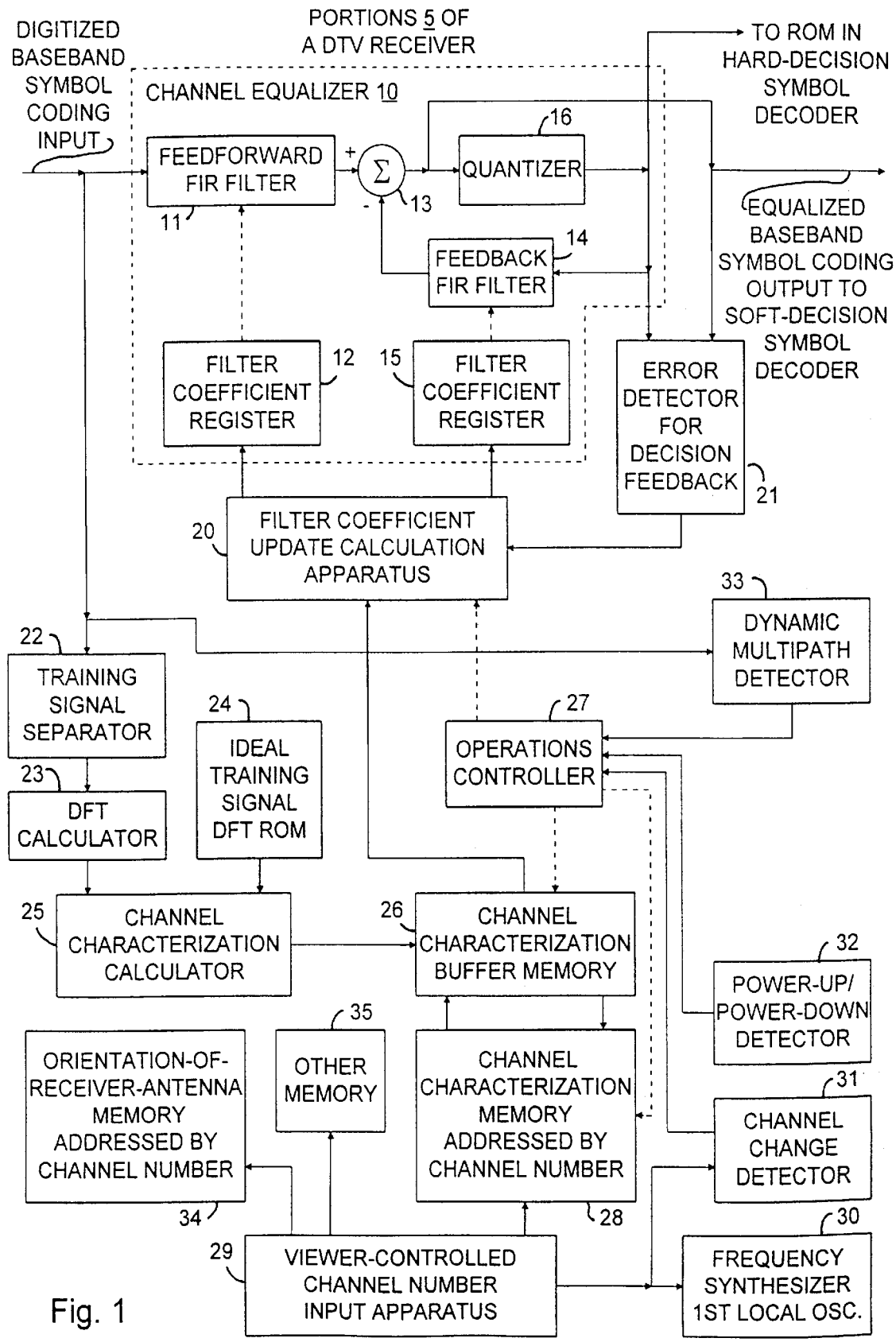
FIG. 1 is a schematic diagram of a channel equalizer used in a digital television receiver embodying the invention, which channel equalizer includes a memory for storing channel characterization coefficient terms for each received channel.

FIG. 1 shows portions 5 of a DTV receiver embodying the invention which differ from DTV receivers as known in the prior art. Digitized baseband symbol coding is supplied to a channel equalizer 10 comprising a finite-impulse-response (FIR) digital filter 11 having filtering coefficients stored in a temporary storage register 12, a digital subtractor 13, an FIR digital filter 14 having filtering coefficients stored in a temporary storage register 15, and a quantizer 16. The FIR filter 11 is operated in the channel equalizer 10 as a feedforward FIR filter for suppress near ghosts. The feedforward FIR filter helps suppress pre-ghosts, multipath responses that are received earlier than the principal DTV signal is received. The subtractor 13, the FIR filter 14 and the quantizer 16 combine to provide an infinite-impulse-response (IIR) filter. The FIR filter 14, which has filtering coefficients stored in a temporary storage register 12, is operated as a feedback FIR filter in this IIR filter. This IIR filter helps suppress post-ghosts, multipath responses that are received later than the principal DTV signal is received.

The digitized baseband symbol coding may be supplied to the channel equalizer 10 from a synchronous demodulator operated in the digital regime for demodulating digitized DTV intermediate-frequency signals. This arrangement is described in U.S. Pat. No. 5,479,449 entitled "DIGITAL VSB DETECTOR WITH BANDPASS PHASE TRACKER, AS FOR INCLUSION IN AN HDTV RECEIVER" issued Dec. 26, 1995 to C. B. Patel and A. L. R. Limberg. Alternatively, the digitized baseband symbol coding may be supplied from an analog-to-digital converter digitizing baseband symbol coding from a synchronous demodulator that demodulates DTV intermediate-frequency signals in the analog regime.

Filter-coefficient-update calculation apparatus 20 updates the contents of the temporary storage register 12 that holds the adaptive filter coefficients for the feedforward FIR filter 11. The calculation apparatus 20 also updates the contents of the temporary storage register 15 that holds the adaptive filter coefficients for the feedback FIR filter 14. Each of the temporary storage registers 12 and 15 is dual-ported comprising a serial-in/parallel-out (or SIPO) component register and a parallel-in/parallel-out (or PIPO) component register. The initial stage of the SIPO component register can be serially written through a serial-input port; and the final output stage of the SIPO component register can be serially read through a serial-output port, which permits selective looping of the SIPO component register. Upon command, the stages of the PIPO component register are loaded in parallel from corresponding stages of the SIPO component register. The stages of the PIPO component register in the temporary storage register 12 supply their stored computer coefficients in parallel to digital multipliers in the FIR filter 11. The stages of the PIPO component register in the temporary storage register 15 supply their stored computer coefficients in parallel to digital multipliers in the FIR filter 14.

After initial adaptive filter coefficients for the FIR filters 11 and 14 are established, the calculation apparatus 20 inputs the adaptive filter coefficients temporarily stored in the registers 12 and 15, then updates the adaptive filter coefficients using correction accumulation procedures. The corrections to be used in these accumulation procedures are generated as fractions of errors detected by an error detector 21 for implementing decision feedback. To determine the error of each successive sample of the channel equalizer 10 response supplied from the sum output of the digital subtractor 13, the error detector 21 compares it with the quantized response of the channel equalizer 10 supplied from the quantizer 16.

The quantizer 16 is a digital bin comparator, with the bin numbers corresponding to ideal symbol code levels. So, the response of the quantizer 16 is forced to be one of the ideal symbol code levels. The quantizer 16 ideal symbol code levels can be supplied as input signal to a read-only memory (not shown) that contains a look-up table for decoding symbol codes on a hard-decision basis. The quantizer 16 and the ROM combine to function as what has been termed a "data slicer". The channel equalizer 10 output signal from the subtractor 13 is suitable for decoding symbol codes on a soft-decision basis using a Viterbi decoder. For details concerning symbol decoding the reader is referred to U.S. Pat. No. 5,508,752 entitled "PARTIAL RESPONSE TRELLIS DECODER FOR HIGH DEFINITION TELEVISION (HDTV) SYSTEM" and issued to D. J. Kim, H. S. Kwak and H. J. Nam on Apr. 16, 1996.

Ignoring the presence of severe noise in the channel equalizer 10 output signal from the subtractor 13, this signal will change amongst ideal symbol code levels when convergence is achieved. The quantizer 16 suppresses noise that does not extend beyond data-slice boundaries. Accordingly, including the quantizer 16 within the feedback path in the JIR filter portion of the channel equalizer 10 tends to speed up the final approach towards convergence to eliminate post-ghosts. These advantages are forfeited if the input signal for the feedback FIR filter 14 is taken directly from the difference output of the subtractor 13, instead of as shown in FIG. 1. These advantages also are forfeited if the IIR filter portion of the channel equalizer 10 precedes, rather than succeeds, the feedforward FIR filter 11 in their cascade connection with each other. Including the quantizer 16 in the feedback loop also tends to stabilize the loop against spontaneous oscillation.

The digitized baseband symbol coding supplied to the channel equalizer 10 as input signal is also supplied to a training signal separator 22, which separates training signal from the data field synchronizing (DFS) signal. The training signal separator 22 contains a gating circuit (not shown) responsive to the count supplied from a data segment counter (not shown). When the count indicates that a data segment of a data field containing DFS signal and/or its ghosts appears in the digitized baseband symbol coding, the gating circuit applies the data segment from the current data field to an accumulator (not shown). The accumulator combines the DFS signals and their ghosts from a plurality of fields for extracting the ghosted training signal applied to a DFT calculator 23. When alternate DFS signals are differentially combined in the accumulation, accumulating the DFS signals over a cycle of six data fields or some multiple thereof suppresses artifacts of co-channel NTSC interference in the accumulation result, so channel equalization is less affected by these artifacts.

A read-only memory 24 stores the DFT of a ghost-free "ideal" training signal that is lowpass filtered according to the same Nyquist slope characteristic that one seeks for the upper-frequency portion of the transmission channel. This lowpass filtering of the ghost-free "ideal" training signal stored in ROM 24 is important for minimizing intersymbol interference. DTV receivers are designed attempting to minimize intersymbol interference by properly shaping the spectral response of the transmission channel for transmitting the symbol coding that is translated to digital baseband form for application to the channel equalizer 10. The spectral response is preferably subjected to final shaping after most of the amplification in the receiver has been done, so there is no introduction of a significant level of out-of-band noise by subsequent amplification. The Nyquist slopes at band edge can be established by surface-acoustic-wave filtering in VHF intermediate-frequency amplifiers of the DTV receiver, for example. As the DTV receiver is tuned from one transmission channel to another, however, there will be variations from the desired passband shape, which variations arise from causes other than multipath distortion. Such variations may arise from changing tilts in antenna gain response, for example. Lowpass filtering the "ideal" training signal according to the same Nyquist slope characteristic that one seeks for the upper-frequency portion of the transmission channel provides for automatic adjustment of the filter coefficients of the adaptive channel equalizer to optimize the overall transmission channel characteristic for minimum intersymbol interference.

A channel characterization calculator 25 divides the DFT of the ghosted training signal supplied from the DFT calculator 23 with the DFT of a ghost-free training signal supplied from the ROM 24, term by term, to generate a DFT for the transmission channel. The channel characterization calculator 25 takes the inverse discrete Fourier transform of the DFT for the transmission channel to generate a description of the filtering effects exerted within the channel, which inverse DFT results are referred to as the "channel characterization". The channel characterization represents the filter coefficients of a filter that in the time domain would correspond to the transmission channel. The channel equalizer 10 has filter coefficients that are complementary to those of this filter that in the time domain would correspond to the transmission channel. Therefore, the cascade connection of the channel equalizer 10 after the transmission channel provides a composite response to transmitted symbol coding that is substantially free from intersymbol interference and multipath distortion effects.

In practice the filter-coefficient-update calculation apparatus 20, the DFT calculator 23, the channel characterization calculator 25 and the controller 27 are usually implemented within a single microprocessor with software appropriate for directing the calculations associated with each of the elements 20, 25 and 27. Storing the DFT of the Nyquist-filtered ghost-free training signal in ROM 24, rather than the Nyquist-filtered ghost-free training signal itself, eliminates having to calculate its DFT. This reduces the computational load on the microprocessor and speeds overall calculation of channel characterization.

The channel characterization is written, coefficient term by coefficient term as it is generated, into a channel characterization buffer memory 26 from which the channel characterization coefficient terms can be subsequently read. The channel characterization buffer memory 26 is preferably a random-access memory (RAM). Some time after the calculation of the channel characterization coefficient terms is completed, these terms are read from the memory 26 to the filter-coefficient-update calculation apparatus 20. Using procedures known from the prior art, the calculation apparatus 20 responds to these terms to generate a set of updated filter coefficients. (Refer, for example to U.S. Pat. No. 5,331,416 entitled "METHODS FOR OPERATING GHOST-CANCELATION CIRCUITRY FOR TV RECEIVER OR VIDEO RECORDER" issued Jul. 19, 1994 to C. B. Patel and J. Yang. Responsive to instruction from an operations controller 27 these updated filter coefficients are jam-loaded into the filter coefficient registers 12 and 15.

In accordance with the invention, at least more significant ones of this set of channel characterization coefficient terms are also written into storage locations in a channel characterization memory 28. The channel characterization memory 28 is a random-access memory (RAM) each storage location of which is addressed by a respective binary number corresponding to the transmission channel that the DTV receiver currently selects for reception. A viewer-controlled channel-number input apparatus 29 generates this address. The channel characterization memory 28 is of a type that retains its stored contents when power is wholly removed or substantially removed from the DTV receiver. By way of example, the channel-number input apparatus 29 comprises a keypad and a serial-in/parallel out (SIPO) register for receiving the keypad input, located in the DTV receiver control panel or in a remote control unit. Also, the apparatus 29 further comprises a programmable read-only memory (PROM) for converting the keypad input stored in the SIPO register to a binary number used for addressing the channel characterization memory 28.

This binary number can form all or a part of the address for the channel characterization memory 28. The current state of a selector switch determining whether a terrestrial broadcast, a cablecast or a satellite narrowcast is being received can be used for generating bits to be appended to this binary number to form the address for the channel characterization memory 28. This allows different channel characterizations to be stored for the same radio-frequency tuning selection being made from the various types of source.

The viewer-controlled channel-number input apparatus 29 includes read-only memory for converting the keypad input stored in the SIPO register to a binary number used for controlling the frequency generated by a frequency synthesizer 30 that the DTV receiver uses as a first local oscillator. The DTV receiver selects the transmission channel the DTV receiver is to receive by superheterodyning the radio-frequency DTV signal with oscillations from the frequency synthesizer 30 as first local oscillator, to generate intermediate-frequency DTV signal that stays in the same band no matter which transmission channel is selected for reception.

The operations controller 27 controls how the adaptive filter coefficients of the channel equalizer 10 are updated. A channel change detector 31 detects when there is a change in the binary number used for controlling the frequency the frequency synthesizer 30 generates. By way of specific example, the channel change detector 31 can be constructed so as to periodically clock this binary number into a two-stage clocked delay line, differentially combine the binary numbers in the two stages, and combine the bits of the resulting difference in an OR gate. The OR gate generates a ZERO when there is no change in the transmission channel selected for reception. The OR gate generates a ONE when there is a change in the transmission channel selected for reception. When the channel change detector 31 signals the operations controller 27 that the transmission channel selected for reception has been changed, the operations controller 27 supplies a read command to the channel characterization memory 28 and a write command to the channel characterization buffer memory 26. The channel characterization stored at the location in memory 28 addressed by the channel-number input apparatus 29 is loaded to the channel characterization buffer memory 26. The coefficient terms of the channel characterization are then read to the filter-coefficient-update calculation apparatus 20, which generates a set of filter coefficients based from them. The operations controller 27 conditions the calculation apparatus 20 to jam-load this set of coefficients into the filter coefficient registers 12 and 15.

A power-up/power-down detector 32 detects when power is restored to the DTV receiver after having been wholly removed or substantially removed therefrom. When the power-up/power-down detector 32 signals the controller 27 that power is restored, the operations controller 27 supplies a read command to the channel characterization memory 28 and a write command to the channel characterization buffer memory 26. The channel characterization stored at the location in memory 28 addressed by the channel-number input apparatus 29 is loaded to the channel characterization buffer memory 26. The coefficient terms of the channel characterization are then read to the filter-coefficient-update calculation apparatus 20. The controller 27 conditions the calculation apparatus 20 to jam-load this set of coefficients into the filter coefficient registers 12 and 15. The FIR filters 11 and 14 in the channel equalization filter have filter coefficients supplied to them that are the same as at a previous time when the transmission channel that the channel-number input apparatus 29 selected for reception was the same as currently selected. This previous time was the last time that the selected channel was received without substantial dynamic multipath.

The power-up/power-down detector 32 typically includes a capacitor charged from an operating voltage supply through a resistor, and a threshold detector for sensing when the capacitor reaches a substantial portion of full charge. A one-shot or other differentiating network responds to the threshold detector indicating the capacitor has reached a substantial portion of full charge for signaling the controller 27 that operating power has been restored.

So, whenever power is restored in the DTV receiver or there is a change in the transmission channel selected for reception, the FIR filters 11 and 14 are updated to have the same filter coefficients as they had at a previous time when the same transmission channel was selected for reception as is currently selected. This previous time was the last time that the channel was received without substantial dynamic multipath. The operations controller 27 determines the subsequent operation dependent on indications from a dynamic multipath detector 33 as to whether multipath conditions of a dynamic rather than static nature exist or not. If the dynamic multipath detector 33 indicates that multipath conditions of a dynamic rather than static nature do not exist, the filter coefficients of the FIR filters 11 and 14 are updated every few data fields in accordance with received training signal. The operations controller 27 conditions the calculation apparatus 20 to jam-load each new set of coefficients into the filter coefficient registers 12 and 15.

If the dynamic multipath detector 33 indicates that multipath conditions of a dynamic rather than static nature exist, the presumption is that the dynamic multipath conditions will interfere with the proper accumulation of data field synchronizing codes to acquire a training signal for adapting the channel equalizer 10 filter coefficients. Accordingly, the operations controller 27 withholds write enable signal from the channel characterization memory 28. Also, the operations controller 27 conditions the filter-coefficient-update calculation apparatus 20 not to jam-load into the filter coefficient registers 12 and 15 the filter coefficients that are calculated proceeding from the channel characterization coefficient terms. The operations controller 27 instead conditions the filter-coefficient-update calculation apparatus 20 to continually adjust the filter coefficients of the FIR filters 11 and 14 in accordance with a decision-feedback method utilizing the error signal supplied by the error detector 21. Adjustment is on a controlled-rate basis, with only a fraction of the change in each filter coefficient prescribed as a result of decision-feedback calculation being made after each calculation in a succession of iterated calculations.

While the controlled-rate adjustment of the filter coefficients of the FIR filters 11 and 14 can be carried out depending solely on the decision-feedback method utilizing the error signal supplied by the error detector 21, in actual practice it is preferable to use a variant of this method. In these preferred methods of controlled-rate adjustment, the filter coefficients of the FIR filters 11 and 14 are partially adjusted responsive to the results of calculations based on the training signal even though it is corrupted by multipath distortion. The filter conditions are also partially adjusted responsive to the results of calculations based on decision feedback. The results of decision-feedback calculations are supplied more often than the results of training-signal calculations. Accordingly, in making the controlled-rate adjustments, the changes in filter coefficients prescribed as a result of decision-feedback calculations on signal other than training signal are weighted with a smaller scaling factor than the changes in filter coefficients prescribed as a result of training-signal calculations.

By way of example, the dynamic multipath detector 33 can be of a type using principles disclosed in U.S. Pat. No. 5,684,827 entitled "SYSTEM FOR CONTROLLING THE OPERATING MODE OF AN ADAPTIVE EQUALIZER" issued Nov. 4, 1997 to L. E. Nielsen. The dynamic multipath detector 33 and the training signal separator 22 can use the same gating circuit (not shown) responsive to the count supplied from a data segment counter (not shown). The dynamic multipath detector 33 additively combines the data field synchronizing signals from each pair of successive data fields to null the middle 63-sample PN sequence that is inverted in logic sense from one data field to the next. The remaining signal level during this null period is sampled every data field. Variation between successive ones of these samples is measured to determine the degree of change in multipath over time.

The binary number the channel-number input apparatus 29 supplies for addressing the channel characterization memory 28 is used in the FIG. 1 portions 5 of a DTV receiver for addressing a memory 34 for storing information concerning previously optimized receiver antenna orientation information. Such information can be generated by automatic antenna orientation circuitry which at some time in the past has steered the antenna throughout its range(s) of adjustment while recording strength of received signal and has then returned the antenna to the position where recorded signal strength is the greatest. If the DTV receiver is designed to use a plurality of fixed antennas, the responses of which are electrically combined to select the direction of reception, the memory 34 is modified for storing the coefficients that determine how the contributions of the individual antenna responses to the overall antenna response chosen for television signal reception.

The binary number the channel-number input apparatus 29 supplies for addressing the channel characterization memory 28 is used in the FIG. 1 portions 5 of a DTV receiver for addressing other memory 35. By way of example, the other memory 35 can be used for storing any of the following types of information:

(a.) information concerning whether or not the channel characterization memory 28 has been programmed for the currently selected channel;

(b.) information concerning the available sources of received signal for a particular radio-frequency channel being tuned (such as cable or satellite narrowcast or terrestrial broadcast) and viewer preferences for implementing automatic selection of preferred source for each channel;

(c.) information concerning which channels are locked-out for viewing unless keying code is submitted (to prevent children viewing certain channels, etc.);

(d.) information concerning fine-tuning adjustments to the local oscillator(s) used in the DTV receiver;

(e.) information concerning adjustments to be made to the audio reproduction system for each transmission channel; and (f.) information concerning adjustments to be made to the video reproduction system for each transmission channel (to compensate for differences in station black level preferences, burst phase, etc. when receiving NTSC signals).

Storage in the other memory 35 of information concerning whether the channel characterization memory 28 has previously been programmed for the currently selected channel is particularly useful for supplying the operations controller 27 additional information for controlling operations.

Presume that the other memory 35 stores bit indications as to whether or not the channel characterization memory 28 has previously been programmed for the currently selected channel. The operations controller 27 can receive information (e. g., from a simple magnetometer) as to whether the DTV receiver was moved to its current location after the last time it was powered. Responsive to indication that the DTV receiver was moved, the operations controller 27 can direct the selective erasing of all indications stored in the memory 35 that channels had been previously programmed. The operations controller 27 can respond to an indication supplied from the memory 35 that the channel characterization memory 28 has previously been programmed for the currently selected channel, to direct initialization of the filter coefficients stored in the registers 12 and 15 as described supra. That is, the registers 12 and 15 are jam-loaded with the contents of the location in the channel characterization memory 28 addressed in accordance with the channel currently selected by the channel-number input apparatus 29. However, responsive to an indication supplied from the memory 35 that the channel characterization memory 28 has previously been programmed for the currently selected channel, the operations controller 27 can direct over-ride addressing of the channel characterization memory 28. This implements the jam-loading of the registers 12 and 15 from a storage location storing channel characterization coefficients for transmissions received free from multipath distortion.

After restoration of full power to the DTV receiver or after tuning to a different channel, there is a time interval before the dynamic multipath detector 33 is able to acquire sufficient information to indicate whether or not multipath conditions of a dynamic rather than static nature exist. During this interval the updating of the filter coefficients in the registers 12 and 15 continues being done on a recurrent jam-loading basis responsive to channel characterization coefficients calculated from training signals separated from baseband symbol coding. The operations controller 27 defers the writing of the channel characterization memory 28 from the channel characterization buffer memory 26 until the dynamic multipath detector 33 indicates that multipath conditions of a dynamic rather than static nature do not exist in substantial amount, unless the memory 35 has supplied the controller 27 an indication that the channel characterization memory 28 has not previously been programmed for the currently selected channel. If the memory 35 has supplied the operations controller 27 an indication that the channel characterization memory 28 has not previously been programmed for the currently selected channel, the controller 27 conditions the channel characterization memory 28 for being written from the channel characterization buffer memory 26. The rationale for doing this is that the actual channel characterization coefficients are likely to be a better starting point for equalization procedures than arbitrarily prescribed channel characterization coefficients.

The memories 28, 34 and 35 are each of a type that retains its stored contents when power is wholly removed or substantially removed from the DTV receiver. This can be provided for by arranging for power to continue to be applied to the memories 28, 34 and 35 (and to a remote control receiver, if such exists) at times application of power to other portions of the receiver is discontinued. However, if mains power is interrupted, the contents of the memories 28, 34 and 35 will be lost. So, after even a brief interruption in mains power, considerable time will be required to regain the lost content of the memories 28, 34 and 35. The time required for restoring the lost contents of the memories 28, 34 and 35 will be most noticeable if channel surfing is attempted after the failure of power. Accordingly, the memories 28, 34 and 35 are each preferably of electrically erasable programmable read-only memory (EEPROM) type. So is the PROM included in the channel-number input apparatus 29 for converting the keypad input stored in the SIPO register to addressing the memories 28, 34 and 35.

Often partial suppression of just a few strongest ghosts is sufficient so that symbol decoding can be successfully carried forward. Only rarely is the principal received signal accompanied by more than five significant ghosts thereof, and there is seldom need for more than nine to eleven filter coefficients involved in the suppression of each ghost. So only 45–55 channel characterization coefficient terms need be stored in the channel characterization memory 28 to suppress five significant ghosts. Especially in less expensive DTV receivers, it may be desired to reduce the amount of storage required in the channel characterization memory 28 by storing information concerning only the larger coefficient terms in the channel characterization. For example, the design can be such that the channel characterization memory 28 stores only the sixty-four largest coefficient terms for the channel characterization of each channel. When these larger coefficient terms are read from the channel characterization memory 28 to the channel characterization buffer memory 26, they are used to write over arithmetic zeroes that have been previously inserted into all addressable locations within the buffer memory 26.

Figure 2:
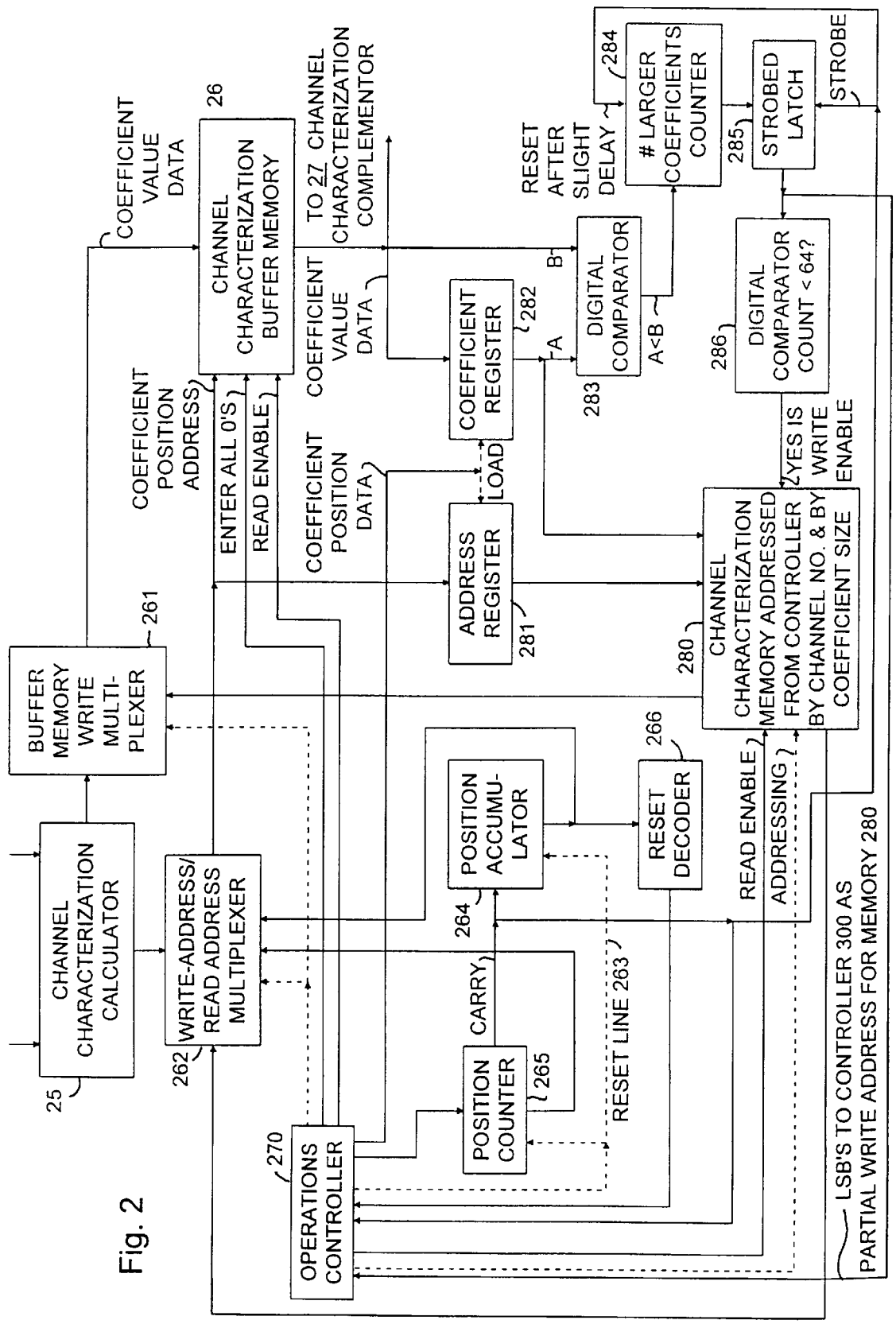
FIG. 2 is a schematic diagram of a channel equalizer as shown generally in FIG. 1, which channel equalizer includes a random-access memory for storing only selected channel characterization coefficient terms for each received channel.

FIG. 2 illustrates one way of doing this. The storage locations of the channel characterization buffer memory 26 have respective filter coefficients written thereto from a buffer-memory write multiplexer 261. The addressing of the storage locations of the channel characterization buffer memory 26 is supplied via a write-address/read-address multiplexer 262. The channel characterization memory 280 is a species of the channel characterization memory 28 in which the storage locations are addressable both by channel number and by a measure of the amplitude of the channel characterization coefficient term that is stored. Each addressable storage location is divided into sublocations, ones of which sublocations store the amplitudes of the larger coefficient terms in the channel characterization and others of which sublocations store the identities of these larger coefficient terms within the time domain. An operations controller 270 carries out the functions of the FIG. 1 operations controller 27 and (as will be described in some detail hereafter) implements further functions concerning the storage in the channel characterization memory 280 of only those coefficient terms in the channel characterization that are of larger amplitude.

Whenever power is restored in the DTV receiver or there is a change in the transmission channel selected for reception, the operations controller 270 does the following. The operations controller 270 sets the contents of all storage locations in the channel characterization buffer memory 26 to arithmetic zero. This could be done by successively scanning all the locations of the buffer memory 26 while writing arithmetic zeroes to them. In a preferable implementation the buffer memory 26 is constructed to permit arithmetic zeroes to be entered into all storage locations responsive to an ENTER ALL 0'S command signal from the operations controller 270. Then, the controller 270 supplies a write enable signal to the channel characterization buffer memory 26; and the operations controller 270 supplies a read enable signal to the channel characterization memory 280. The operations controller 270 supplies the buffer-memory write multiplexer 261 with a control signal conditioning the multiplexer 261 to reproduce, as write input signal to the channel characterization buffer memory 26, the amplitudes of the larger coefficient terms in the channel characterization for the currently tuned transmission channel. These larger coefficient terms and the corresponding addresses for their writing into the memory 26 are read from the channel characterization memory 280 responsive to addresses supplied to the memory 280 from the operations controller 270. These addresses comprise the channel number as a partial address and another partial address that increments to access progressively smaller ones of the larger channel characterization coefficient terms stored in the characterization memory 280. This other partial address is generated by a partial-address counter (not explicitly shown) within the operations controller 270. The operations controller 270 supplies the write-address/read-address multiplexer 262 with a control signal conditioning the multiplexer 262 to reproduce, as write addresses for the channel characterization buffer memory 26, addresses of the larger channel characterization coefficient terms read from the channel characterization memory 280. These procedures load the channel characterization buffer memory 26 with an estimated channel characteristic for the transmission channel once again being received. The operations controller 270 then directs the writing of the estimated channel characterization from the channel characterization buffer memory 26 to the calculation apparatus 20 which calculates initial filter coefficients from the estimated channel characterization. The operations controller 270 commands the calculation apparatus 20 to jam-load the initial filter coefficients into the filter coefficient registers 12 and 15 to complete the establishment of initial filter coefficients in the channel equalizer 10.

The following portion of this specification describes how portions of updated channel characterization from the channel characterization calculator 25 can be selected for storage in the channel characterization buffer memory 26. When an update of the channel characterization buffer memory 26 has been completed, the operations controller 270 resets via a reset line 263 a position accumulator 264 and a position counter 265 to initial address values. These initial address values are associated with the address of an initial coefficient term in the channel characterization stored in the channel characterization buffer memory 26. For example, these initial address values are both binary arithmetic zeroes.

Then, the operations controller 270 commands the loading of an address temporary storage register 281 and a coefficient temporary storage register 282. At this time the operations controller 270 applies a control signal to the write-address/read-address multiplexer 262 that conditions it to address the channel characterization buffer memory 26 with the address value supplied from the position accumulator 264. This address value is loaded into the address temporary storage register 281. At this time the operations controller 270 applies a read enable signal to the channel characterization buffer memory 26. The coefficient temporary storage register 282 is loaded with the corresponding coefficient term of the channel characterization as read from the channel characterization buffer memory 26. The channel characterization coefficient term stored in the coefficient temporary storage register 282 is supplied therefrom as A input signal to a digital comparator 283 which A input signal is to be compared by the comparator 283 to each other channel characterization coefficient term stored in the channel characterization buffer memory 26.

Accordingly, the operations controller 270 next applies a control signal to the write-address/read-address multiplexer 262 for conditioning it to address the channel characterization buffer memory 26 with each successive address value supplied from the position counter 265. At the same time, the operations controller 270 supplies read enable signal to the memory 26 and supplies system clocking pulses to the position counter 265 for counting. The addresses supplied from the position counter 265 via the multiplexer 262 to the channel characterization buffer memory 26 successively scans each location therein for reading as B input signal to the digital comparator 283. The digital comparator 283 generates a logic ONE for each successive B input signal that is smaller than the A input signal that corresponds to the channel characterization coefficient term currently stored in the register 282. A counter 284 counts these ONEs to supply a count indicative of the number of channel characterization coefficient terms that have been scanned that are larger than the channel characterization coefficient term currently stored in the register 282. After the last address in the channel characterization buffer memory 26 has been scanned responsive to the incrementing count in the position counter 265, the position counter 265 generates a carry signal. If the number of positions to be counted by the counter 265 is not an integral power of two, a decoder responsive to last count can be used to generate the carry signal to reset the count to initial value. The carry signal is applied as a strobe signal to a strobed latch 285 and as reset after slight delay to the counter 284. The strobed latch 285 momentarily stores the final count from the counter 284 indicative of the number of channel characterization coefficient terms that have been scanned that are larger than the channel characterization term currently stored in the register 282. The strobed latch 285 supplies this momentarily stored final count to the operations controller 270 and to a digital comparator 286. The digital comparator 286 determines whether the channel characterization coefficient term currently stored in the register 282 is large enough to be written into the characterization memory 280. More particularly, the digital comparator 286 generates a write enable signal for the channel characterization memory 280 if and only if the final count supplied from the counter 284 via the strobed latch 285 is smaller than the limit on the number of channel characterization coefficient terms with position addresses that can be stored within that memory. The operations controller 270 supplies the channel characterization memory 280 a write address composed of the channel number of the transmission channel currently tuned to for reception and the number of the signal source of the transmission channel as partial addresses. This write address further comprises a partial address responsive to the final count from the counter 284 that the strobed latch 285 supplies to the operations controller 270. If and only if the channel characterization memory 280 receives a write enable signal from the digital comparator 286, the addressed location of that memory is written. It is written with the channel characterization coefficient term stored in the coefficient register 282 together with the address of that channel characterization coefficient term in the buffer memory 26 as currently stored in the register 281.

The carry signal that the position counter 265 generates also increments the read address stored in the position accumulator 264. The carry signal prompts the operations controller 270 to supply the write-address/read-address multiplexer 262 a control signal that conditions the multiplexer 262 to address the channel characterization buffer memory 26 with the address value supplied from the position accumulator 264. This prepares for the process of determining whether the next coefficient term in the channel characterization stored in the buffer memory 26 is to be stored in the channel characterization memory 280. Except for the buffer memory 26 read address stored in the position accumulator 264 having been incremented, this process repeats the process just described. When the last coefficient term in the channel characterization stored in the buffer memory 26 is evaluated to determine whether it is to be stored in the channel characterization memory 280, the controller 270 is advised of this by a reset decoder 266. The reset decoder 266 response rises to ONE when it detects the position accumulator 264 output signal accumulating to an out-of-bounds address. This occurs responsive to a carry signal supplied from the position counter 265 after the last channel characterization coefficient term stored in the buffer memory 26 has been compared to every other channel characterization coefficient term stored in the buffer memory 26.

Figure 3:
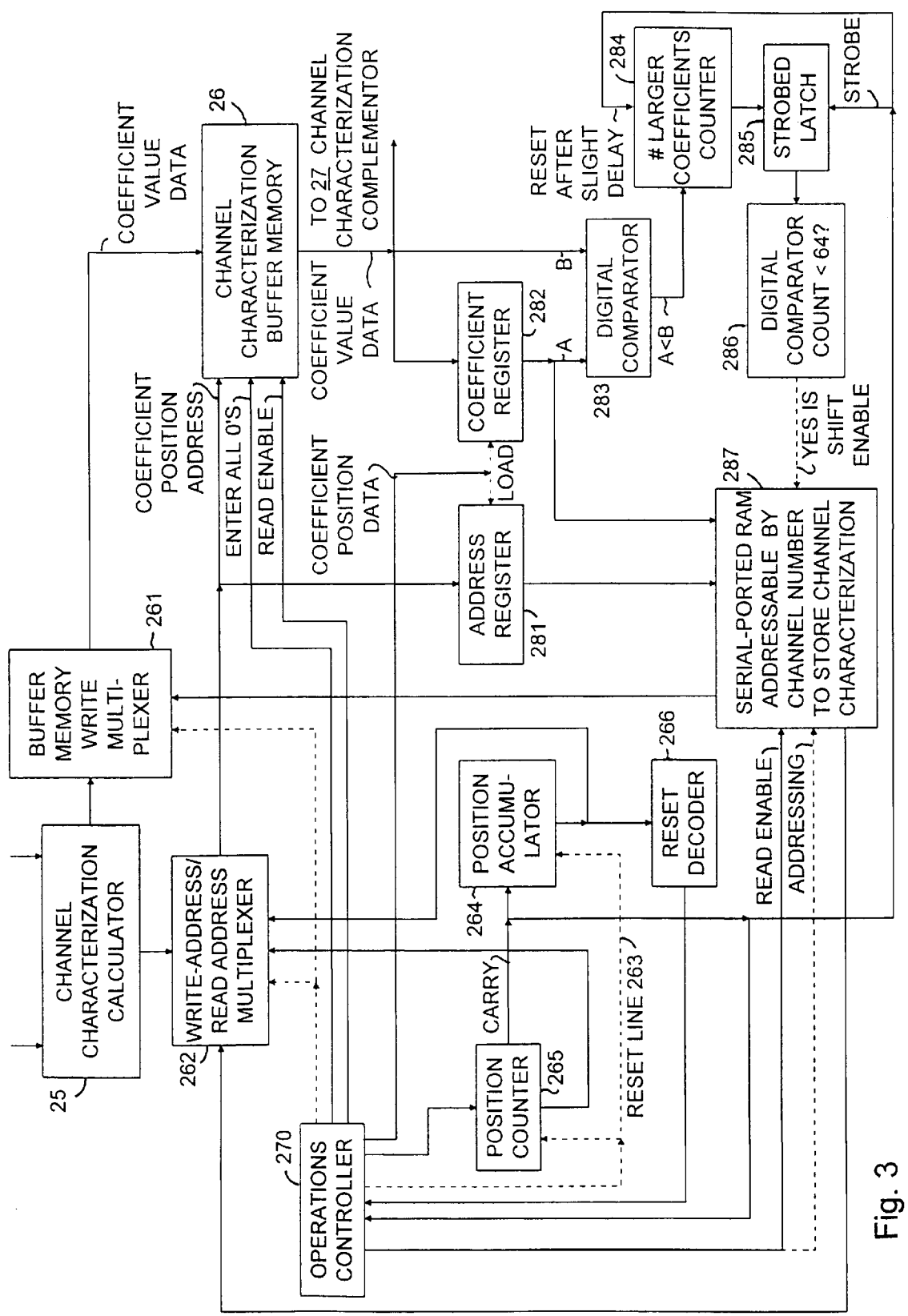
FIG. 3 is a schematic diagram of another channel equalizer as shown generally in FIG. 1, which channel equalizer includes a serial-port random-access memory for storing only selected channel characterization coefficient terms for each received channel.

FIG. 3 shows a way alternative to that shown in FIG. 2 of storing information concerning only the more serious nulls in the channel characterization in the channel characterization memory. A serial-ported RAM 287 replaces the channel characterization memory 280 shown in FIG. 2. The RAM 287 is random-access addressed just by the channel number generated by the viewer-controlled channel-number input apparatus 29. The digital comparator 286 supplies the RAM 287 a shift enable signal for its serial-input port if and only if the channel characterization coefficient term currently stored in the register 282 is large enough to be written into the RAM 287. The operations controller 270 controls the reading out from the RAM 287 done whenever power is restored in the DTV receiver or there is a change in the transmission channel selected for reception. Reading is through a serial-output port of the RAM 287 to an input of the buffer memory write multiplexer 261.

Figure 4:
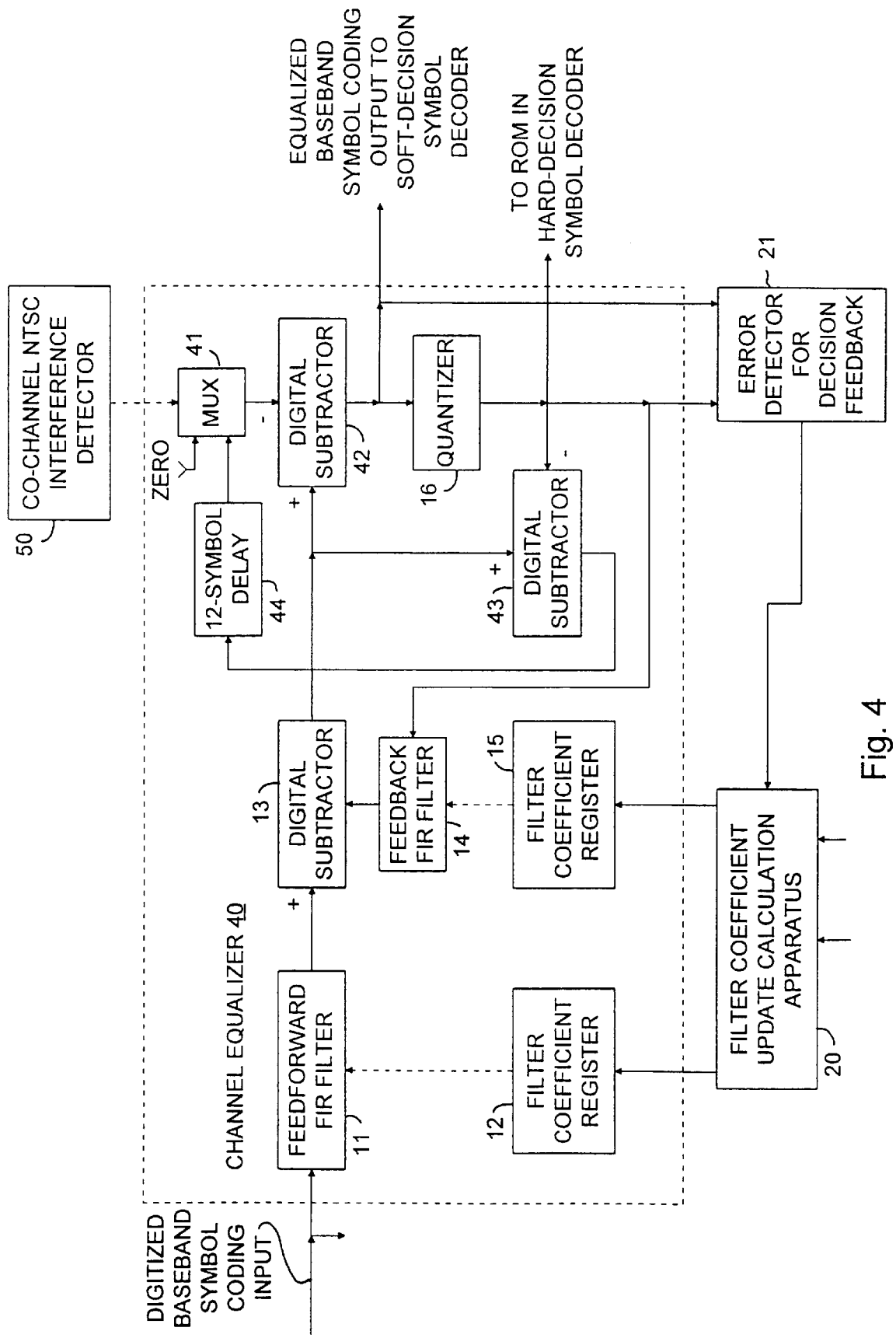
FIG. 4 is a schematic diagram of a modification of the FIG. 1 channel equalizer to mitigate the effects of co-channel NTSC interference on channel equalization.

FIG. 4 shows a channel equalizer 40 that is a modification of the FIG. 1 channel equalizer 10 which further includes filtering for suppressing artifacts of co-channel NTSC interference in the baseband symbol coding. FIG. 4 shows a co-channel NTSC interference detector 50 for detecting when such artifacts are present. The detector 50 can take a variety of known forms. When the DTV receiver includes circuitry for receiving NTSC signals as well as DTV signals, a preferred form of co-channel NTSC interference detector 50 detects the level of the intercarrier generated by mixing audio and video carriers during DTV reception. This type of detector 50 is described in detail in allowed U.S. patent application Ser. No. 08/821,945 filed Mar. 19, 1997 by A. L. R. Limberg, entitled USING INTERCARRIER SIGNALS FOR DETECTING NTSC INTERFERENCE IN DIGITAL TV RECEIVERS, and assigned to Samsung Electronics Co., Ltd.

When the co-channel NTSC interference detector 50 output signal indicates that artifacts of co-channel NTSC interference accompanying baseband symbol code in the equalization filter 40 input signal are insubstantial and unlikely to affect quantizing or data-slicing results, a multiplexer 41 is conditioned to reproduce its first input signal, a wired arithmetic zero, as its output signal which is supplied to a digital subtractor 42 as subtrahend input signal. Accordingly, the difference output signal of the subtractor 13 received as minuend input signal by the subtractor 42 is reproduced in its difference output signal supplied to the quantizer 16. Operation is substantially the same as in the channel equalizer 10 of FIG. 1.

When the co-channel NTSC interference detector 50 output signal indicates that artifacts of co-channel NTSC interference accompanying baseband symbol code in the equalization filter 40 input signal are substantial and likely to affect quantizing or data-slicing results, the multiplexer 41 is conditioned to reproduce its second input signal in its output signal supplied to the digital subtractor 42 as subtrahend input signal. The second input signal of the multiplexer 41 is a predicted estimate of the current value of the artifact of co-channel NTSC interference accompanying baseband symbol code in the subtractor 13 difference output signal. The subtractor 42 subtracts this estimate from its minuend input signal, the difference output signal from the subtractor 13. The difference signal from the subtractor 42 comprises baseband symbol code with substantially no accompanying artifacts of co-channel NTSC interference and is supplied to the quantizer 16 as its input signal. To the extent there are no accompanying artifacts of co-channel NTSC interference in the quantizer 16 input signal, the operation of the channel equalizer 40 will remain similar to the FIG. 1 channel equalizer 10.

In FIG. 4 the predicted estimate of the co-channel NTSC interference artifacts currently accompanying baseband symbol code in the subtractor 13 difference output signal is based on a revised estimate of the artifacts of co-channel NTSC interference accompanying a baseband symbol twelve symbol epochs earlier. A digital subtractor 43 receives the subtractor 13 difference output signal as its minuend input signal and receives the quantizer 16 output signal as its subtrahend input signal. The difference output signal from the subtractor 43 is a revised estimate of the artifacts currently accompanying baseband symbol code in the subtractor 13 difference output signal. This revised estimate does not affect the quantizing or data-slicing results already supplied by the quantizer 16, but is saved for use as a predicted estimate of the artifacts accompanying baseband symbol code in the subtractor 13 difference output signal twelve symbol epochs later. That is, the difference output signal from the subtractor 43 is applied to delay circuitry 44, which delays that signal by twelve symbol epochs before its application as second input signal to the multiplexer 41. For example, a shift register clocked at symbol rate can provide the delay circuitry 44.

Figure 5:
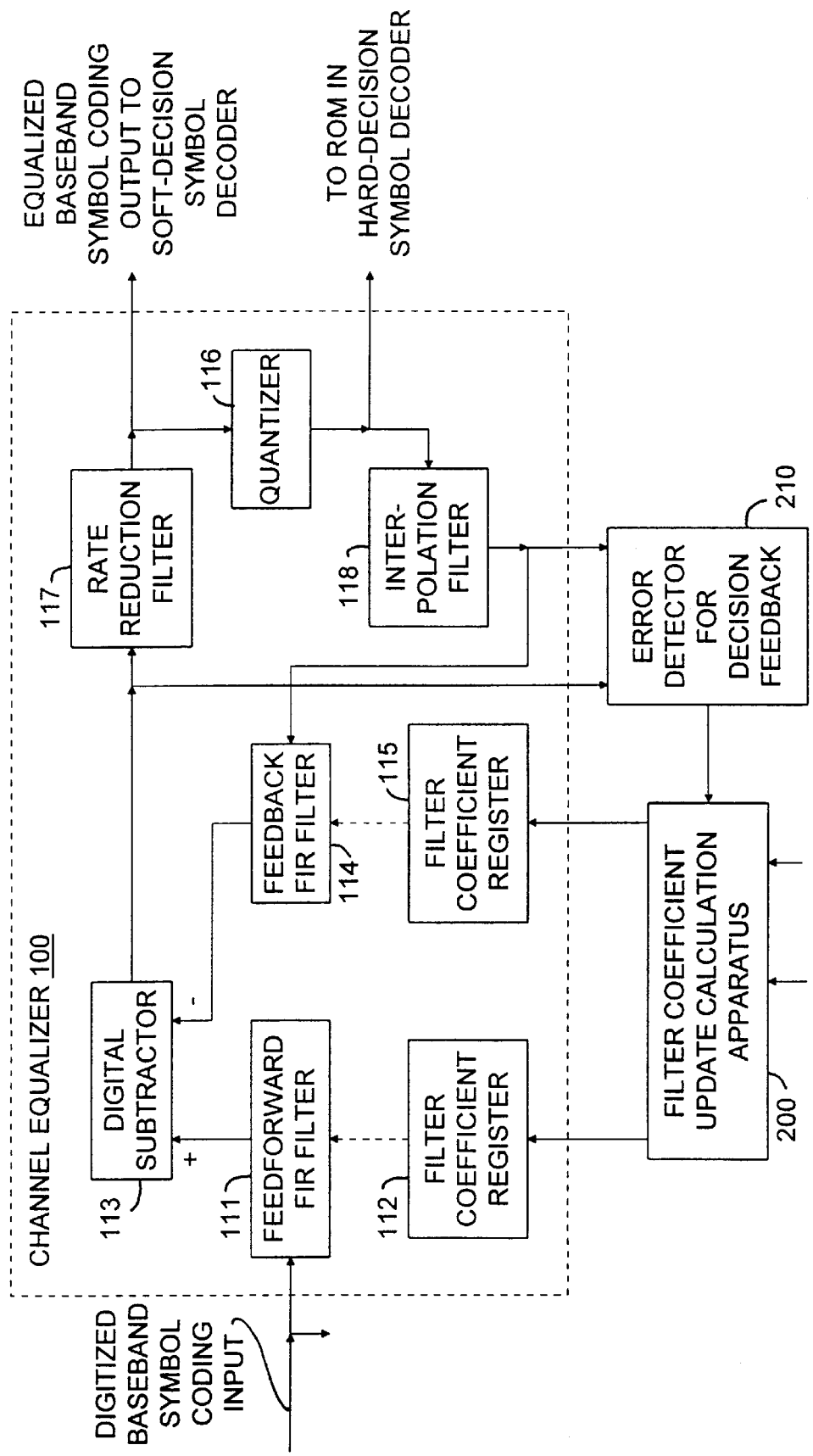
FIGS. 5 and 6 are schematic diagrams of modifications of the FIG. 1 channel equalizer to provide fractionally spaced equalization.

FIG. 5 shows a channel equalizer 100 that provides fractionally spaced equalization and can be used instead of the FIG. 1 channel equalizer 10. The inclusion of the quantizer 16 within the feedback path in the ITR filter portion of the channel equalizer 10 in FIG. 1 implies that the digitized baseband coding is sampled at symbol rate in the output signal from the channel equalizer 10. In such case the design of the error detector 21 for decision feedback can be conventional. The digitized baseband coding is sampled at symbol rate in the input signal to the channel equalizer 10 as well, with both the FIR filters 11 and 14 being clocked at symbol rate. In the channel equalizer 100 of FIG. 5 a feedforward FIR filter 111 and a feedback FIR filter 114 are operated at a sample rate above symbol rate to provide "fractionally-spaced equalization", with baseband symbol code input being digitized to suit. A digital subtractor 113 differentially combines the responses from the FIR filters 111 and 114 at this higher sample rate to supply equalized channel response in which equalization at band edges is much improved. This higher sample rate can be twice symbol rate, for example, but the improvement is attainable at a sample rate of only four-thirds symbol rate. A rate reduction filter 117 re-samples the subtractor 116 difference output signal to symbol rate to generate input signal for the quantizer 116. The quantizer 116 output signal is supplied to an interpolation filter 118 for re-sampling back to the higher symbol rate used for clocking the FIR filters 111 and 114 to generate input signal for the FIR filter 114.

Clocking the FIR filters 111 and 114 at four-thirds symbol rate rather than twice symbol rate is normally preferable, even though the filters 117 and 118 are more complex in their design when a sample rate four-thirds symbol rate is employed. This is because fewer taps are required in the FIR filters 111 and 114 when sampling is done at four-thirds symbol rate. Sampling at four-thirds symbol rate is normally preferable, even if synchrodyning of the symbol coding to baseband is done in the digital regime at a sample rate twice symbol rate, so a rate reduction filter is required before the channel equalizer 100 in order that FIR filters 111 and 114 can be clocked at this lower rate.

Filter-coefficient-update calculation apparatus 200 updates the contents of the temporary storage registers 112 and 115 that hold the adaptive filter coefficients for the FIR filters 111 and 114 respectively. The temporary storage registers 112 and 115 are of the same general construction as the temporary storage registers 12 and 15 used in the channel equalizer 10 of FIG. 1. However, the temporary storage registers 112 and 115 are relatively extended in their lengths to store more coefficients owing to the larger numbers of taps in the fractionally spaced equalizer component filters 111 and 114. The channel characterization supplied to the filter-coefficient-update calculation apparatus 200 is calculated with finer temporal resolution. An error detector 210 differentially combines the subtractor 113 output signal with the interpolation filter 118 response to generate an error signal with finer temporal resolution. This error signal is supplied to the filter-coefficient-update calculation apparatus 200 for supporting decision-feedback calculations of adjustments to be made to the filter coefficients stored in the registers 112 and 115.

Figure 6:
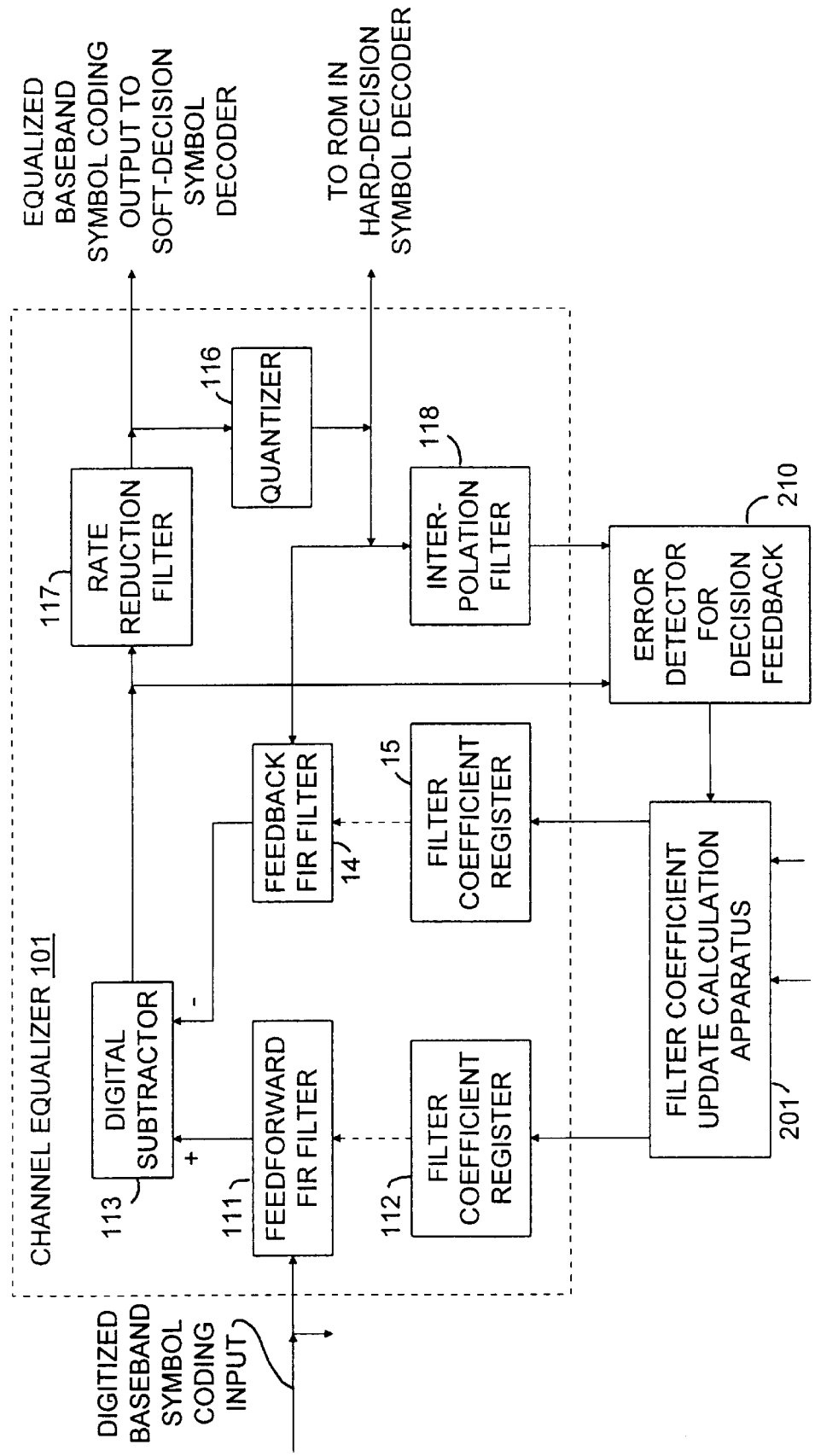

FIG. 6 shows a channel equalizer 101 that provides fractionally spaced equalization. The channel equalizer 101 differs from the channel equalizer 100 in that the feedback FIR filter 14 that receives the output signal of the quantizer 116 directly as input signal replaces the feedback FIR filter 114 that receives the output signal of the quantizer 116 via the interpolation filter 118. The feedback FIR filter 14 is clocked at symbol rate rather than at the higher sample rate that the feedforward FIR filter 111 is and uses the shorter length temporary storage register 15 for storing its filter coefficients rather than the extended length register 115. An interpolation filter 119, similar in construction to the interpolation filter 118, converts feedback FIR filter 14 response to higher sample rate subtrahend input signal for the subtractor 113. The coefficient adjustments for the feedback FIR filter 14 can be calculated by calculating the adjustments for the replaced feedback FIR filter 114 and then applying appropriate sample rate reduction filtering to them.

Figure 7:
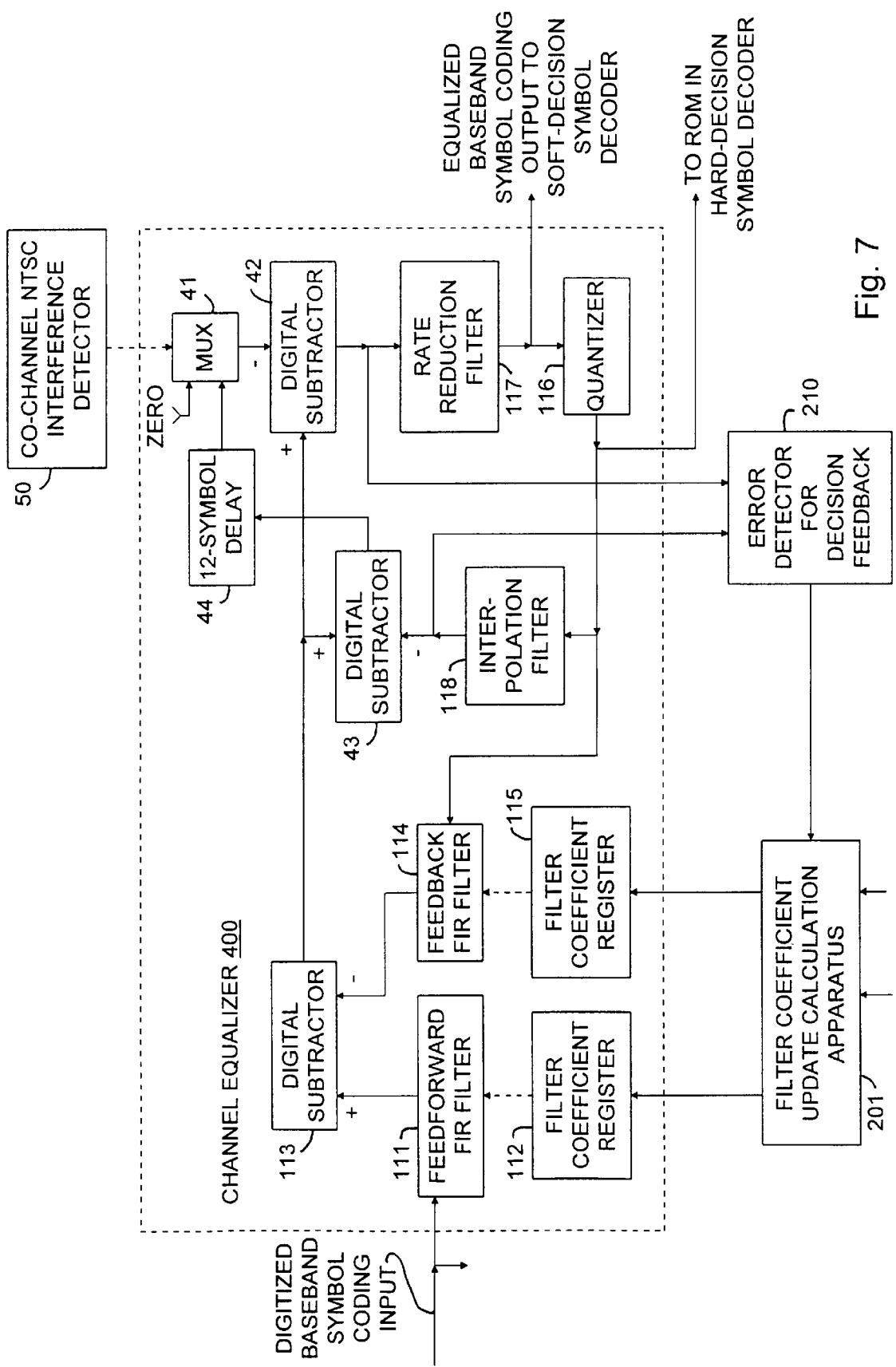
FIG. 7 is a schematic diagram of a modification of the FIG. 4 channel equalizer to provide fractionally spaced equalization.

FIG. 7 shows a channel equalizer 400 that is a modification of the channel equalizer 40 to provide fractionally spaced equalization in the same manner that the channel equalizer 100 does.

What is claimed is:

1. A digital television receiver capable of receiving a digital television signal transmitted via any selected one of a plurality of transmission channels, said digital television receiver including circuitry for detecting said digital television signal to generate digital baseband symbol code and including a channel equalizer, said channel equalizer comprising:

a channel equalization filter having an input connection to which said digital baseband symbol code is supplied, having adaptive filtering coefficients, and having an output connection for supplying a channel equalization filter response;

a memory for storing channel characterization coefficient terms at storage locations addressed in response to which of said plurality of transmission channels is currently selected for reception, said memory of a type for storing said channel characterization coefficient terms even during times other portions of said digital television receiver do not receive power for operating;

calculation circuitry, for calculating from said digital baseband symbol code supplied to said channel equalizer the channel characterization coefficient terms to be stored in said memory at said storage locations addressed in response to the one of said plurality of transmission channels currently selected for reception, and for calculating the adaptive filtering coefficients of said channel equalization filter from said channel characterization coefficient terms; and an operations controller, said operations controller arranged for responding to said other portions of said digital television receiver regaining power to direct the updating of the adaptive filtering coefficients of said channel equalization filter by said calculation circuitry in response to the channel characterization coefficient terms for the currently tuned channel being read thereto from said memory, said operations controller arranged for responding to a transmission channel being re-tuned for reception to direct the updating of the adaptive filtering coefficients of said channel equalization filter by said calculation circuitry in response to the channel characterization coefficient terms for the re-tuned channel being read thereto from said memory;

circuitry for separating a training signal from said digital baseband symbol code supplied to channel equalizer; and memory for storing a priori information concerning a ghost-free training signal, said calculation circuitry calculating the coefficient terms of the channel characterization for a transmission channel currently selected for reception based on the training signal separated from said channel equalization filter response and on said a priori information concerning said ghost-free training signal as drawn from said memory for storing such information, and said operations controller directing the writing of the coefficient terms of the channel characterization thus calculated at said currently selected storage locations in said memory for replacing corresponding coefficient terms previously stored at said currently selected storage locations in said memory.

2. A digital television receiver as set forth in claim 1, further comprising:

further memory for storing antenna orientation information at storage locations addressed in response to which of said plurality of transmission channels is currently selected for reception, said memory of a type for storing said channel characteristics during times other portions of said digital television receiver do not receive power for operating.

3. A digital television receiver as set forth in claim 1, further comprising:

an error detector for detecting errors in said channel equalization filter response to generate an error signal as for decision-feedback equalization; and circuitry for determining whether or not the average energy of said error signal is within a range in which decision-feedback equalization can be effective, said calculation circuitry being of a type for calculating the adaptive filtering coefficients of said channel equalization filter dependent on a decision-feedback method applied to said error signal when and only when the average energy of said error signal is determined to be within a range in which decision-feedback equalization can be effective.

4. A digital television receiver as set forth in claim 1, further comprising:

circuitry for separating a training signal from said digital baseband symbol code supplied to channel equalizer; and memory for storing a priori information concerning a ghost-free training signal, said calculation circuitry calculating the coefficient terms of the channel characterization for a transmission channel currently selected for reception based on the training signal separated from said channel equalization filter response and on said a priori information concerning said ghost-free training signal as drawn from said memory for storing such information, and said operations controller directing the writing of the coefficient terms of the channel characterization thus calculated at said currently selected storage locations in said memory for replacing corresponding coefficient terms previously stored at said currently selected storage locations in said memory.

5. A digital television receiver as set forth in claim 4, further comprising:

an error detector for detecting errors in said channel equalization filter response to generate an error signal as for decision-feedback equalization; and circuitry for determining whether or not the average energy of said error signal is within a range in which decision-feedback equalization can be effective, said calculation circuitry being of a type for calculating the adaptive filtering coefficients of said channel equalization filter dependent on a decision-feedback method applied to said error signal when and only when the average energy of said error signal is determined to be within a range in which decision-feedback equalization can be effective.

6. A digital television receiver as set forth in claim 4, wherein said memory for storing a priori information concerning a ghost-free training signal stores a priori information concerning the Nyquist lowpass filter response of said ghost-free training signal.

7. A digital television receiver as set forth in claim 6, wherein said memory for storing a priori information concerning a ghost-free training signal stores a priori information concerning the discrete Fourier transform of the Nyquist lowpass filter response of said ghost-free training signal.

8. A digital television receiver as set forth in claim 7, further comprising:

an error detector for detecting errors in said channel equalization filter response to generate an error signal as for decision-feedback equalization; and circuitry for determining whether or not the average energy of said error signal is within a range in which decision-feedback equalization can be effective, said calculation circuitry being of a type for calculating the adaptive filtering coefficients of said channel equalization filter dependent on a decision-feedback method applied to said error signal when and only when the average energy of said error signal is determined to be within a range in which decision-feedback equalization can be effective.

9. A digital television receiver capable of receiving a digital television signal transmitted via any selected one of a plurality of transmission channels, said digital television receiver including circuitry for detecting said digital television signal to generate digital baseband symbol code and including a channel equalizer, said channel equalizer comprising:

a channel equalization filter having an input connection to which said digital baseband symbol code is supplied, having adaptive filtering coefficients, and having an output connection for supplying a channel equalization filter response;

a memory for storing amplitudes and respective positions of up to a prescribed number of the larger coefficient terms of each of the respective channel characterizations of said plurality of transmission channels at storage locations addressed in response to which of said plurality of transmission channels is currently selected for reception, said memory of a type for storing said channel characteristic coefficient terms even during times other portions of said digital television receiver do not receive power for operating; and calculation circuitry, for calculating from said digital baseband symbol code supplied to said channel equalizer channel characterization coefficient terms for the one of said plurality of transmission channels currently selected for reception, for calculating the adaptive filtering coefficients of said channel equalization filter from said channel characterization coefficient terms of the one of said plurality of transmission channels currently selected for reception, and for calculating the adaptive filtering coefficients of said channel equalization filter from said prescribed number of the larger coefficient terms of the one of said plurality of transmission channels currently selected for reception, as read from said memory and augmented by estimates of the smaller coefficient terms of the one of said plurality of transmission channels currently selected for reception;

an operations controller, said operations controller arranged for responding to said other portions of said digital television receiver regaining power to direct the updating of the adaptive filtering coefficients of said channel equalization filter by said calculation circuitry in response to said prescribed number of the larger coefficient terms of the channel characterization of the one of said plurality of transmission channels currently selected for reception being read to said calculation circuitry from said memory, and said operations controller arranged for responding to a transmission channel being re-tuned for reception to direct the updating of the adaptive filtering coefficients of said channel equalization filter by said calculation circuitry in response to said prescribed number of the larger coefficient terms of the channel characterization of said re-tuned channel being read to said calculation circuitry from said memory;

circuitry for separating a training signal from said digital baseband symbol code supplied to channel equalizer; and memory for storing a priori information concerning a ghost-free training signal, said calculation circuitry calculating the coefficient terms of the channel characterization for a transmission channel currently selected for reception based on the training signal separated from said channel equalization filter response and on said a priori information concerning said ghost-free training signal as drawn from said memory for storing such information.

12. A digital television receiver as set forth in claim 9, further comprising:

further memory for storing antenna orientation information at storage locations addressed in response to which of said plurality of transmission channels is currently selected for reception, said memory of a type for storing said channel characteristics during times other portions of said digital television receiver do not receive power for operating.

11. A digital television receiver as set forth in claim 9, further comprising:

circuitry for determining whether each coefficient term of the channel characterization for a transmission channel currently selected for reception, as calculated by said calculation circuitry based on the training signal separated from said channel equalization filter response and on said a priori information concerning said ghost-free training signal as drawn from said memory for storing such information, is sufficiently large for storage in said memory, said operations controller directing the writing of the amplitudes and respective positions of the coefficient terms of the channel characterization thus calculated and determined to be sufficiently large at said currently selected storage locations in said memory for replacing coefficient terms previously stored at said currently selected storage locations in said memory.

12. A digital television receiver as set forth in claim 11, further comprising:

an error detector for detecting errors in said channel equalization filter response to generate an error signal as for decision-feedback equalization; and circuitry for determining whether or not the average energy of said error signal is within a range in which decision-feedback equalization can be effective, said calculation circuitry being of a type for calculating the adaptive filtering coefficients of said channel equalization filter dependent on a decision-feedback method applied to said error signal when and only when the average energy of said error signal is determined to be within a range in which decision-feedback equalization can be effective.

13. A digital television receiver capable of receiving a digital television signal transmitted via any selected one of a plurality of transmission channels, said digital television receiver including circuitry for detecting said digital television signal to generate digital baseband symbol code and including a channel equalizer, said channel equalizer comprising:

a channel equalization filter having an input connection to which said digital baseband symbol code is supplied, having adaptive filtering coefficients, and having an output connection for supplying a channel equalization filter response;

a memory for storing amplitudes and respective positions of up to a prescribed number of the larger coefficient terms of each of the respective channel characterizations of said plurality of transmission channels at storage locations addressed in response to which of said plurality of transmission channels is currently selected for reception and in response to the sizes of the stored coefficient terms of said channel characterization for that said transmission channel, said memory of a type for storing said channel characteristic coefficient terms even during times other portions of said digital television receiver do not receive power for operating; and calculation circuitry, for calculating from said digital baseband symbol code supplied to said channel equalizer channel characterization coefficient terms for the one of said plurality of transmission channels currently selected for reception, for calculating the adaptive filtering coefficients of said channel equalization filter from said channel characterization coefficient terms of the one of said plurality of transmission channels currently selected for reception, and for calculating the adaptive filtering coefficients of said channel equalization filter from said prescribed number of the larger coefficient terms of the one of said plurality of transmission channels currently selected for reception, as read from said memory and augmented by estimates of the smaller coefficient terms of the one of said plurality of transmission channels currently selected for reception;

an operations controller, said operations controller arranged for responding to said other portions of said digital television receiver regaining power to direct the updating of the adaptive filtering coefficients of said channel equalization filter by said calculation circuitry in response to said prescribed number of the larger coefficient terms of the channel characterization of the one of said plurality of transmission channels currently selected for reception being read to said calculation circuitry from said memory, and said operations controller arranged for responding to a transmission channel being re-tuned for reception to direct the updating of the adaptive filtering coefficients of said channel equalization filter by said calculation circuitry in response to said prescribed number of the larger coefficient terms of the channel characterization of said re-tuned channel being read to said calculation circuitry from said memory;

circuitry for separating a training signal from said digital baseband symbol code supplied to channel equalizer; and memory for storing a priori information concerning a ghost-free training signal, said calculation circuitry calculating the coefficient terms of the channel characterization for a transmission channel currently selected for reception based on the training signal separated from said channel equalization filter response and on said a priori information concerning said ghost-free training signal as drawn from said memory for storing such information.

14. A digital television receiver as set forth in claim 13, further comprising:

further memory for storing antenna orientation information at storage locations addressed in response to which of said plurality of transmission channels is currently selected for reception, said memory of a type for storing said channel characteristics during times other portions of said digital television receiver do not receive power for operating.

15. A digital television receiver as set forth in claim 13, further comprising:

circuitry for determining whether each coefficient term of the channel characterization for a transmission channel currently selected for reception, as calculated by said calculation circuitry based on the training signal separated from said channel equalization filter response and on said a priori information concerning said ghost-free training signal as drawn from said memory for storing such information, is sufficiently large for storage in said memory, said operations controller directing the writing of the amplitudes and respective positions of the coefficient terms of the channel characterization thus calculated and determined to be sufficiently large at said currently selected storage locations in said memory for replacing coefficient terms previously stored at said currently selected storage locations in said memory.

16. A digital television receiver as set forth in claim 15, further comprising:

an error detector for detecting errors in said channel equalization filter response to generate an error signal as for decision-feedback equalization; and circuitry for determining whether or not the average energy of said error signal is within a range in which decision-feedback equalization can be effective, said calculation circuitry being of a type for calculating the adaptive filtering coefficients of said channel equalization filter dependent on a decision-feedback method applied to said error signal when and only when the average energy of said error signal is determined to be within a range in which decision-feedback equalization can be effective.

17. A digital television receiver capable of receiving a digital television signal transmitted via any selected one of a plurality of transmission channels, said digital television receiver including circuitry for detecting said digital television signal to generate digital baseband symbol code and including a channel equalizer, said channel equalizer comprising:

a channel equalization filter having an input connection to which said digital baseband symbol code is supplied, having adaptive filtering coefficients, and having an output connection for supplying a channel equalization filter response;

a memory for storing channel characterization coefficient terms at storage locations addressed in response to which of said plurality of transmission channels is currently selected for reception, said memory of a type for storing said channel characterization coefficient terms even during times other portions of said digital television receiver do not receive power for operating;

calculation circuitry, for calculating from said digital baseband symbol code supplied to said channel equalizer the channel characterization coefficient terms to be stored in said memory at said storage locations addressed in response to the one of said plurality of transmission channels currently selected for reception, and for calculating the adaptive filtering coefficients of said channel equalization filter from said channel characterization coefficient terms; and an operations controller, said operations controller arranged for responding to said other portions of said digital television receiver regaining power to direct the updating of the adaptive filtering coefficients of said channel equalization filter by said calculation circuitry in response to the channel characterization coefficient terms for the currently tuned channel being read thereto from said memory, said operations controller arranged for responding to a transmission channel being re-tuned for reception to direct the updating of the adaptive filtering coefficients of said channel equalization filter by said calculation circuitry in response to the channel characterization coefficient terms for the re-tuned channel being read thereto from said memory; and further memory for storing antenna orientation information at storage locations addressed in response to which of said plurality of transmission channels is currently selected for reception, said memory of a type for storing said channel characteristics during times other portions of said digital television receiver do not receive power for operating.

18. A digital television receiver capable of receiving a digital television signal transmitted via any selected one of a plurality of transmission channels, said digital television receiver including circuitry for detecting said digital television signal to generate digital baseband symbol code and including a channel equalizer, said channel equalizer comprising:

a channel equalization filter having an input connection to which said digital baseband symbol code is supplied, having adaptive filtering coefficients, and having an output connection for supplying a channel equalization filter response;

a memory for storing channel characterization coefficient terms at storage locations addressed in response to which of said plurality of transmission channels is currently selected for reception, said memory of a type for storing said channel characterization coefficient terms even during times other portions of said digital television receiver do not receive power for operating;

calculation circuitry, for calculating from said digital baseband symbol code supplied to said channel equalizer the channel characterization coefficient terms to be stored in said memory at said storage locations addressed in response to the one of said plurality of transmission channels currently selected for reception, and for calculating the adaptive filtering coefficients of said channel equalization filter from said channel characterization coefficient terms; and an operations controller, said operations controller arranged for responding to said other portions of said digital television receiver regaining power to direct the updating of the adaptive filtering coefficients of said channel equalization filter by said calculation circuitry in response to the channel characterization coefficient terms for the currently tuned channel being read thereto from said memory, said operations controller arranged for responding to a transmission channel being re-tuned for reception to direct the updating of the adaptive filtering coefficients of said channel equalization filter by said calculation circuitry in response to the channel characterization coefficient terms for the re-tuned channel being read thereto from said memory circuitry for separating a training signal from said digital baseband symbol code supplied to channel equalizer;

circuitry for separating a training signal from said digital baseband symbol code supplied to channel equalizer; and memory for storing a priori information concerning a ghost-free training signal, said calculation circuitry calculating the coefficient terms of the channel characterization for a transmission channel currently selected for reception based on the training signal separated from said channel equalization filter response and on said a priori information concerning said ghost-free training signal as drawn from said memory for storing such information, and said operations controller directing the writing of the coefficient terms of the channel characterization thus calculated at said currently selected storage locations in said memory for replacing corresponding coefficient terms previously stored at said currently selected storage locations in said memory.

19. A digital television receiver as set forth in claim 18, further comprising:

an error detector for detecting errors in said channel equalization filter response to generate an error signal as for decision-feedback equalization; and circuitry for determining whether or not the average energy of said error signal is within a range in which decision-feedback equalization can be effective, said calculation circuitry being of a type for calculating the adaptive filtering coefficients of said channel equalization filter dependent on a decision-feedback method applied to said error signal when and only when the average energy of said error signal is determined to be within a range in which decision-feedback equalization can be effective.

20. A digital television receiver as set forth in claim 18, wherein said memory for storing a priori information concerning a ghost-free training signal stores a priori information concerning the Nyquist lowpass filter response of said ghost-free training signal.

21. A digital television receiver as set forth in claim 20, wherein said memory for storing a priori information concerning a ghost-free training signal stores a priori information concerning the discrete Fourier transform of the Nyquist lowpass filter response of said ghost-free training signal.

22. A digital television receiver as set forth in claim 21, further comprising:

an error detector for detecting errors in said channel equalization filter response to generate an error signal as for decision-feedback equalization; and circuitry for determining whether or not the average energy of said error signal is within a range in which decision-feedback equalization can be effective, said calculation circuitry being of a type for calculating the adaptive filtering coefficients of said channel equalization filter dependent on a decision-feedback method applied to said error signal when and only when the average energy of said error signal is determined to be within a range in which decision-feedback equalization can be effective.

23. A digital television receiver capable of receiving a digital television signal transmitted via any selected one of a plurality of transmission channels, said digital television receiver including circuitry for detecting said digital television signal to generate digital baseband symbol code and including a channel equalizer, said channel equalizer comprising:

a channel equalization filter having an input connection to which said digital baseband symbol code is supplied, having adaptive filtering coefficients, and having an output connection for supplying a channel equalization filter response;

a memory for storing amplitudes and respective positions of up to a prescribed number of the larger coefficient terms of each of the respective channel characterizations of said plurality of transmission channels at storage locations addressed in response to which of said plurality of transmission channels is currently selected for reception, said memory of a type for storing said channel characteristic coefficient terms even during times other portions of said digital television receiver do not receive power for operating; and calculation circuitry, for calculating from said digital baseband symbol code supplied to said channel equalizer channel characterization coefficient terms for the one of said plurality of transmission channels currently selected for reception, for calculating the adaptive filtering coefficients of said channel equalization filter from said channel characterization coefficient terms of the one of said plurality of transmission channels currently selected for reception, and for calculating the adaptive filtering coefficients of said channel equalization filter from said prescribed number of the larger coefficient terms of the one of said plurality of transmission channels currently selected for reception, as read from said memory and augmented by estimates of the smaller coefficient terms of the one of said plurality of transmission channels currently selected for reception;

an operations controller, said operations controller arranged for responding to said other portions of said digital television receiver regaining power to direct the updating of the adaptive filtering coefficients of said channel equalization filter by said calculation circuitry in response to said prescribed number of the larger coefficient terms of the channel characterization of the one of said plurality of transmission channels currently selected for reception being read to said calculation circuitry from said memory, and said operations controller arranged for responding to a transmission channel being re-tuned for reception to direct the updating of the adaptive filtering coefficients of said channel equalization filter by said calculation circuitry in response to said prescribed number of the larger coefficient terms of the channel characterization of said re-tuned channel being read to said calculation circuitry from said memory; and further memory for storing antenna orientation information at storage locations addressed in response to which of said plurality of transmission channels is currently selected for reception, said memory of a type for storing said channel characteristics during times other portions of said digital television receiver do not receive power for operating.

24. A digital television receiver capable of receiving a digital television signal transmitted via any selected one of a plurality of transmission channels, said digital television receiver including circuitry for detecting said digital television signal to generate digital baseband symbol code and including a channel equalizer, said channel equalizer comprising:

a channel equalization filter having an input connection to which said digital baseband symbol code is supplied, having adaptive filtering coefficients, and having an output connection for supplying a channel equalization filter response;

a memory for storing amplitudes and respective positions of up to a prescribed number of the larger coefficient terms of each of the respective channel characterizations of said plurality of transmission channels at storage locations addressed in response to which of said plurality of transmission channels is currently selected for reception and in response to the sizes of the stored coefficient terms of said channel characterization for that said transmission channel, said memory of a type for storing said channel characteristic coefficient terms even during times other portions of said digital television receiver do not receive power for operating; and calculation circuitry, for calculating from said digital baseband symbol code supplied to said channel equalizer channel characterization coefficient terms for the one of said plurality of transmission channels currently selected for reception, for calculating the adaptive filtering coefficients of said channel equalization filter from said channel characterization coefficient terms of the one of said plurality of transmission channels currently selected for reception, and for calculating the adaptive filtering coefficients of said channel equalization filter from said prescribed number of the larger coefficient terms of the one of said plurality of transmission channels currently selected for reception, as read from said memory and augmented by estimates of the smaller coefficient terms of the one of said plurality of transmission channels currently selected for reception; and an operations controller, said operations controller arranged for responding to said other portions of said digital television receiver regaining power to direct the updating of the adaptive filtering coefficients of said channel equalization filter by said calculation circuitry in response to said prescribed number of the larger coefficient terms of the channel characterization of the one of said plurality of transmission channels currently selected for reception being read to said calculation circuitry from said memory, and said operations controller arranged for responding to a transmission channel being re-tuned for reception to direct the updating of the adaptive filtering coefficients of said channel equalization filter by said calculation circuitry in response to said prescribed number of the larger coefficient terms of the channel characterization of said re-tuned channel being read to said calculation circuitry from said memory; and further memory for storing antenna orientation information at storage locations addressed in response to which of said plurality of transmission channels is currently selected for reception, said memory of a type for storing said channel characteristics during times other portions of said digital television receiver do not receive power for operating.

* * * * *